United States Patent

Rettig et al.

[11] Patent Number: 5,884,210
[45] Date of Patent: Mar. 16, 1999

[54] PROGRAMMABLE ENGINE PARAMETER VERIFICATION APPARATUS AND METHOD OF OPERATING SAME

[75] Inventors: Mark E. Rettig, Peoria; Thomas R. Sandborg, Mapleton, both of Ill.

[73] Assignee: Caterpillar Inc., Peoria, Ill.

[21] Appl. No.: 703,590

[22] Filed: Aug. 27, 1996

[51] Int. Cl.⁶ .............................. G06F 19/00; B60T 7/18

[52] U.S. Cl. .......................... 701/115; 180/167; 301/10.1

[58] Field of Search ........................... 123/436; 180/167; 701/2, 36, 48, 101, 102, 115; 340/438, 439, 459, 825.3, 825.31, 425.5; 307/9.1, 10.1, 10.4, 10.5

[56] References Cited

U.S. PATENT DOCUMENTS

| | | | |
|---|---|---|---|
| 4,660,528 | 4/1987 | Buck | 180/167 |
| 5,365,436 | 11/1994 | Schaller et al. | 307/9.1 |
| 5,445,128 | 8/1995 | Letang et al. | 123/436 |
| 5,717,387 | 2/1998 | Suman et al. | 340/825.31 |

*Primary Examiner*—Willis R. Wolfe
*Attorney, Agent, or Firm*—R. Carl Wilbur

[57] ABSTRACT

A programmable electronic engine controller includes customer programmable engine and vehicle operating parameters. A communications device is connectable to said engine controller. Stored in the communications device are a predetermined set of parameters. The communications device downloads the engine and vehicle operating parameters that are present in the engine controller, compares those values to corresponding predetermined parameters, and prints an exception report based on that comparison.

5 Claims, 2 Drawing Sheets

PROGRAMMABLE ENGINE PARAMETER VERIFICATION APPARATUS AND METHOD OF OPERATING SAME

TECHNICAL FIELD

The present invention relates to compression ignition engines, and more particularly, to electronically controlled, programmable compression ignition engines.

BACKGROUND OF THE INVENTION

In mechanically controlled compression ignition engines, the engine's physical structure often determines its operating characteristics. It is, therefore, difficult to vary the operating characteristics without varying the physical structure of the engine. With the advent of electronically controlled engines, the operating characteristics of the engine, and of the vehicle in which the engine is installed, could be easily changed by programming different parameters into the electronic controller.

When electronic controllers were first introduced on compression ignition engines, it was typical for all parameters to be preprogrammed into the controller at the factory. One set of parameters that typically are programmed at the factory are fuel limit data, which are stored as a function of engine speed and determine the rated horsepower output of the engine. Other factors that may be programmed into the engine may include fuel injection timing, engine speed limits and power derate strategies, among others. As electronic engine control became more well accepted and microprocessors and other control components became more robust, the controller was able to control other characteristics such as maximum vehicle speed, among others. In some electronically controlled engines, the customer is permitted to program some parameter values to most closely tailor the engine operating characteristics to her desired application.

For example, if the engine was purchased by a fleet, the fleet manager may want to limit the maximum speed at which the vehicle operator can drive to thereby improve fuel mileage. To provide the greatest flexibility and allow for differences in specific applications, the fleet manager would be permitted to program the maximum vehicle speed value within a range of permissible maximum vehicle speed values. Similarly, the fleet manager or end user might be permitted to program other operating conditions into the electronic controller.

Vehicle operators sometimes do not like the programmed limits and other values programmed by the fleet manager into the controller. And, in some instances vehicle operators or someone else might reprogram the customer selectable values to values other than those originally selected by the fleet manager. In those cases it would be possible for the vehicle operator to defeat some of the objectives of the fleet manager (e.g., to conserve fuel by limiting the maximum vehicle speed.) In prior art compression ignition engines, the fleet manager cannot tell that these values have been changed without driving the vehicle and guessing based on engine and vehicle performance.

It would be desirable to have an electronically controlled engine that could download a report to the fleet manager or other appropriate responsible party that would indicate to the fleet manager that the customer controlled parameters had been changed to values other than those that were originally programmed.

SUMMARY OF THE INVENTION

In one aspect of the present invention a method of verifying customer programmed engine operating parameters is disclosed. The method is used in connection with an electronic controller on a compression ignition engine, where the electronic controller has an input/output device which permits input of data into the electronic controller and output of data from the electronic controller. The method generally includes the steps of downloading customer programmed engine operating parameters, comparing the parameters with a predetermined set of expected parameters, and producing an output in response to said step of comparing.

In another aspect of the present invention an apparatus for use in connection with an compression ignition engine is disclosed. The apparatus generally includes an electronic controller and memory connected to the electronic controller. Stored in the memory is a plurality of customer programmed vehicle operating parameters. The apparatus also includes a communication device connected to the electronic controller, where the communication device permits customer selected vehicle parameters to be programmed into the electronic controller and to be read from the electronic controller. The electronic controller preferably controls the engine at least in part based on the customer selected vehicle parameters. The communication device compares the programmed vehicle parameters to a predetermined set of desired engine and vehicle operating parameters, and produces an output indicating which of the programmed vehicle parameters differ from said predetermined set of desired engine and vehicle operating parameters.

These and other aspects and advantages of the present invention will become apparent upon reading the following detailed description of a preferred embodiment in connection with the drawings and appended claims.

DETAILED DESCRIPTION OF A PREFERRED EMBODIMENT OF THE INVENTION

The following is detailed description of a preferred best mode embodiment of the present invention. The following description provides sufficient detail to permit someone skilled in the art to make and use the invention. However, the present invention is not limited to the single preferred embodiment disclosed herein. On the contrary, the present invention encompasses all those devices and methods that fall within the scope of the present invention as defined by the appended claims and equivalents thereof. Throughout the description and the drawings like reference numbers will be used to refer to like elements.

Figure 1:
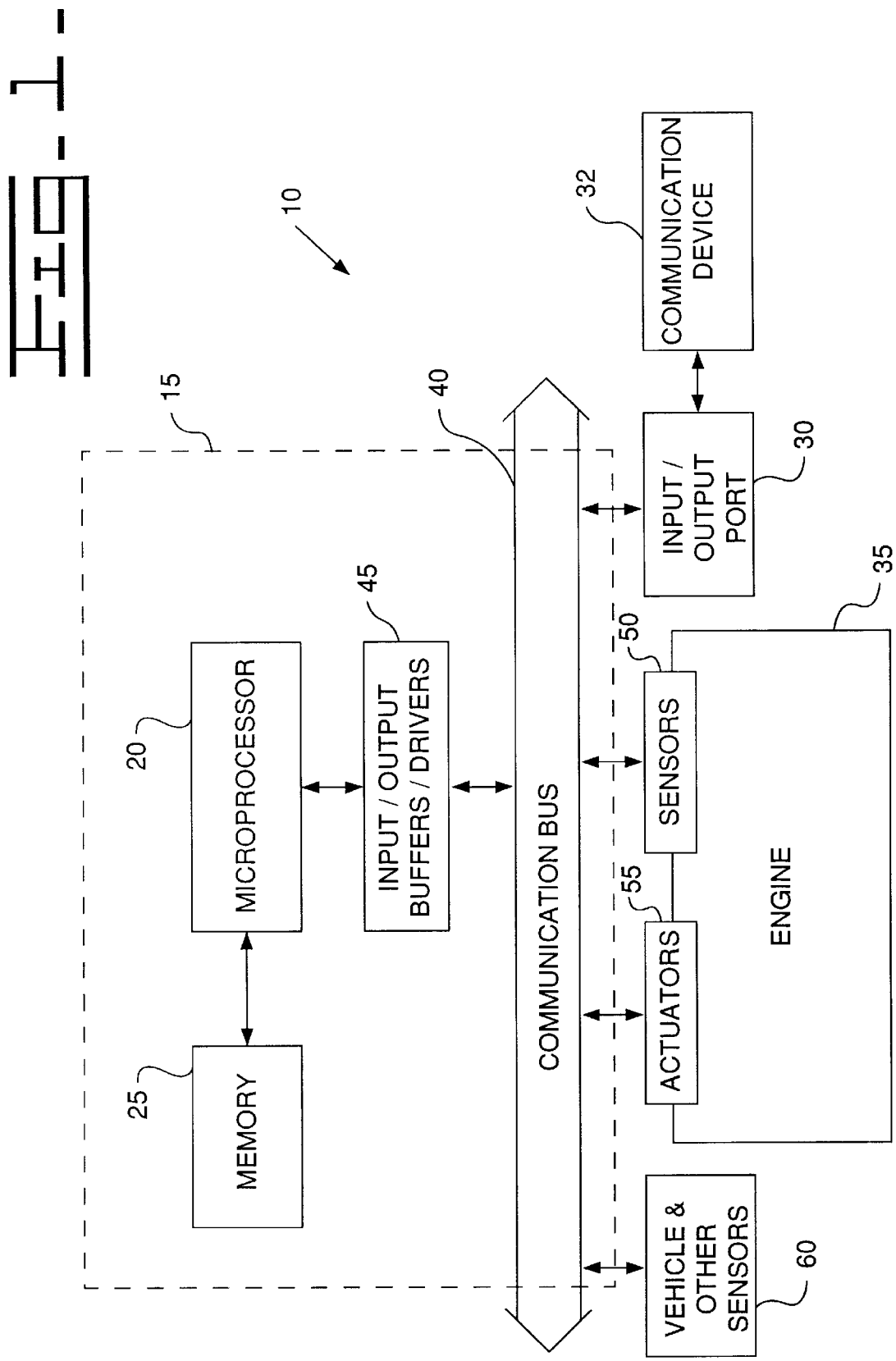
FIG. 1 is a block diagram of an electronic controller for an electronically controlled engine.

Referring first to FIG. 1, a block diagram of a preferred embodiment of the electronic engine and vehicle control system 10 of the present invention is shown. The electronic control 10 preferably includes an electronic control module 15, which includes a microprocessor 20 connected to a memory device 25 and an input/output port 30. In a preferred embodiment, the microprocessor is a Motorola MC68HC11 manufactured by Motorola Corp. However, other microprocessors could be readily and easily used without deviating from the scope of the present invention.

As is known to those skilled in the art, the memory device 25 depicted in FIG. 1 generally stores both software instructions and data. The software instructions stored in the memory device 25 include, among other things, the specific code that controls the engine 35. The data stored in the memory 25 may either be permanently stored or may be temporarily written to the memory device 25 by the microprocessor 20. The microprocessor 20 is therefore generally able to both read data and software instructions from, and write to, the memory device 25.

Also known to those skilled in the art is input signal conditioning/buffering circuitry and output driver circuitry 45. As shown in FIG. 1, the microprocessor 20 is connected to input/output buffer and driver circuitry 45. The input/output buffer and driver circuitry 45 is an interface, buffering and signal conditioning circuit between the microprocessor 20 and the communication bus 40. Signals generated by the microprocessor 20 are transmitted over the communications bus 40. In a preferred embodiment the communications bus 40 satisfies the communications protocols defined by SAE J1587. However, other communications schemes could be readily and easily substituted without deviating from the scope of the present invention as defined by the appended claims. The communications bus 40 is connected to various sensors and actuators, such as vehicle and other sensors 60, actuators 55 and sensors 50 associated with a compression ignition engine 35, and an input/output port 30. The input/output port 30 is a communication port that permits a qualified technician to connect a communication device 32 to the port 30 to enter data or commands into memory 25 or to download data or commands from memory 25. In a preferred embodiment, the communication device is a PC based service tool called the Electronic Technician, available from Caterpillar Inc., Peoria, Ill. However, other programming devices, including personal computers could be used in connection with the present invention.

Figure 2:
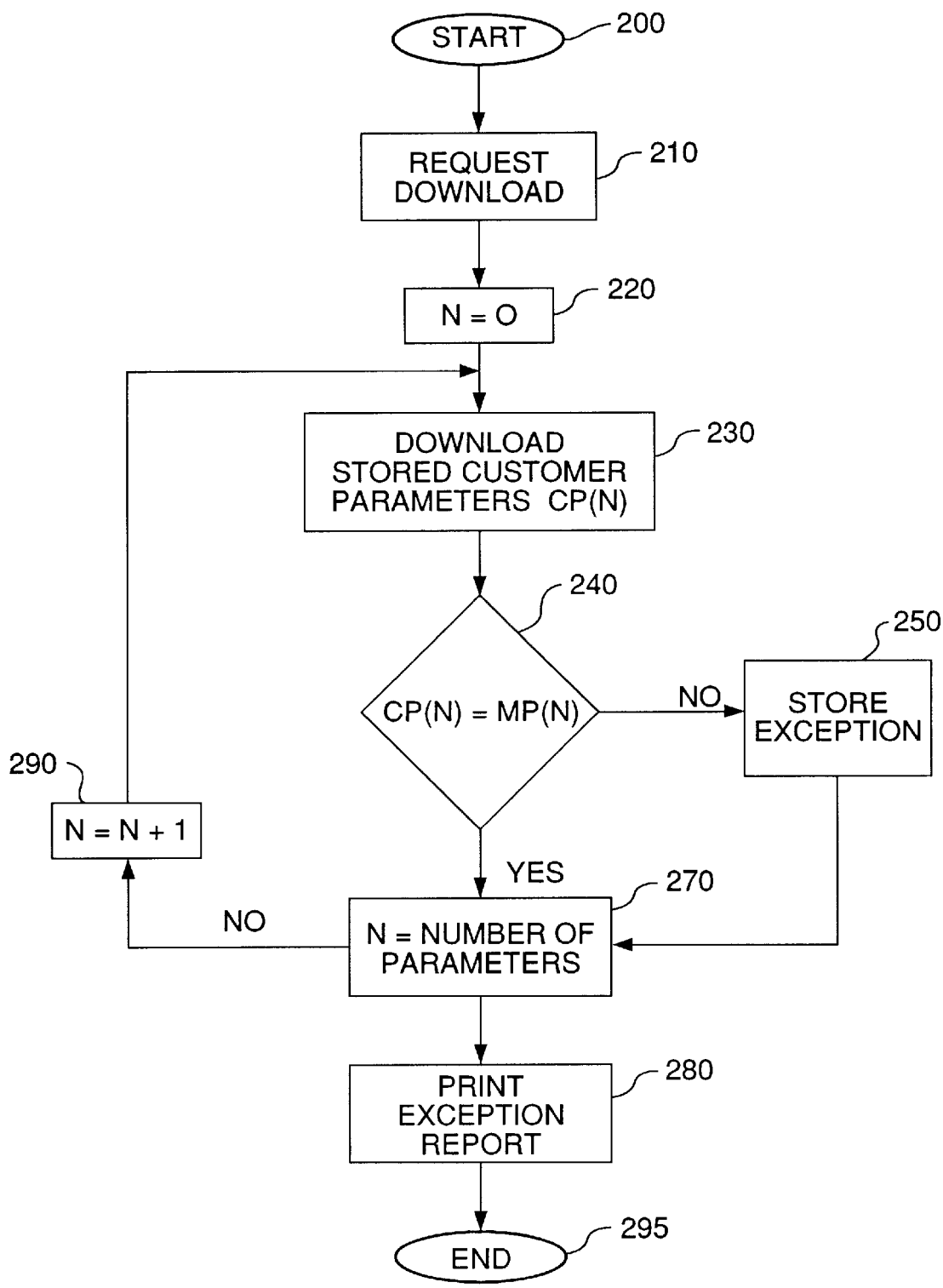
FIG. 2 is a flowchart of the software control of an embodiment of the present invention.

Referring now to FIG. 2, a flowchart of a preferred embodiment of software control of the present invention is shown. The flowchart illustrates an exemplary set of instructions for performing the preferred control. However, as is know to those skilled in the art, the functionality of specific blocks, or the order in which the functions of the blocks are performed, can sometimes be changed without affecting the overall functionality of the control. Thus, it is expected that other block diagrams illustrating similar software control will fall within the scope of the present invention as defined by the appended claims.

The program depicted in the flowchart of FIG. 2 is particularly well adapted for use with the MC68HC11 microprocessor and associated components described above, although any suitable microprocessor may be utilized in practicing an embodiment of the present invention. These flowcharts constitute a complete and workable design of the preferred software program, and have been reduced to practice on the Motorola 68000 series microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

Block 200 begins the control of the preferred embodiment and program control passes to block 210. In block 210 a technician or other operator uses the communication device 32 to request a download of all customer programmable data from memory 25. Program control then passes to block 220.

In block 220, the microprocessor 20 preferably sets a counter N to zero. As is described more fully below, the counter N is used to determine whether all customer programmable data has been downloaded. Program control then passes to block 230.

In block 230, the microprocessor 20 downloads a customer parameter CP(N) through the input/output buffers/drivers 45, the communication bus 40, the input/output port 30 to the communication device 32. Program control then passes to block 240.

In block 240, the communication device 32 compares the downloaded customer parameter CP(N) to a corresponding master parameter MP(N). In a preferred embodiment, the master parameters are stored in memory in the communications device 32. However, in other embodiments it may be possible to store the master parameters in memory 25 in the electronic control module 15. In that case, the comparison would be performed by the microprocessor 20. If, in block 240, the customer parameter CP(N) equals the master parameter MP(N) then program control passes to block 270 and the control determines whether all customer parameters CP(N) have been downloaded. Otherwise program control passes to block 250 where the communication device 32 stores an exception indicating that the customer parameter CP(N) value is different than the expected corresponding master parameter MP(N) value.

From block 250 program control passes to block 270, where the control determines whether all customer parameters CP(N) have been downloaded. If all customer parameters CP(N) have been downloaded, then program control passes to block 280. Otherwise, program control passes to block 290, where the program counter is incremented and program control passes to block 230. In block 230, the next customer parameter CP(N) is downloaded.

In block 280, the communications device 32 prints out a list of those customer parameters CP(N) and values that differed from the corresponding expected master parameter MP(N) values. Although a preferred embodiment uses a printout to notify the operator of the exception report, a display or other modification device could also be used. Program control then passes to block 295 and the software control ends.

In a typical application of the above software control, that desired set of parameters is also stored in the communication device 32 as the master parameters MP(N). A fleet owner will initially set both the customer parameters CP(N) and the master parameter MP(N) values to the desired values. Then, at periodic intervals the fleet operator or truck owner can verify that the customer programmable parameters are the same as the master parameters, and thereby detect tampering if the values differ.

In a preferred embodiment of the present invention, the following table illustrates typical customer parameters that are programmable. The table is exemplary of the parameters that a customer could be permitted to program and that could be verified using the apparatus and method of the present invention. Other parameters could readily and easily be included in this list without deviating from the scope of the present invention, as defined by the appended claims.

CUSTOMER SPECIFIED PARAMETER TABLE

| Parameter | Available Range/Options | Defaults |
|---|---|---|
| Rating Number | Engine Power Dependent | |
| Rating | | |
| Vehicle ID | 17 Digits, Available Characters Service Tool Dependent | all zero's |
| Vehicle ID | | |
| Vehicle Speed Parameters | | |
| Vehicle Speed Calibration, Pulses/mile (pulses/km) | 14000 to 65535 (8696 to 40705) | 1400 (8696) |
| Vehicle Speed Limit, mph (km/h) | 30 to 127 mph (48 to 204 km/h) | 127 mph (204 km/h) |
| VSL Protection (rpm) | 1300 to 2120 rpm | 2120 rpm |
| Tachometer Calibration (pulse/revolution) | 12.0 to 500.0 | 113.0 |
| Soft Vehicle Speed Limit | NO, YES | NO |
| Cruise Control Parameters | | |
| Low Cruise Control Speed Set Limit, mph (km/h) | 15 to 127 mph (24 to 204 km/h) | 127 mph (204 km/h) |
| High Cruise Control Speed Set Limit, mph (km/h) | 30 to 127 mph (48 to 204 km/h) | 127 mph (204 km/h) |
| Engine Retarder | coast, latch, manual | coast |
| Engine Retarder Minimum Vehicle Speed | 0 to 127 mph (0 to 204 km/h) | 0 mph (0 km/h) |
| Auto Retarder in Cruise (0 = Off), mph (km/h) | 0 to 10 mph (0 to 16 km/h) | 0 mph (0 km/h) |
| Auto Retarder in Cruise Increment | 0 to 5 mph (0 to 8 km/h) | 0 mph (0 km/h) |
| Cruise/Idle/PTO Switch Configuration | set/accel, set/decel | set/accel |
| SoftCruise Control | NO, YES | YES |
| Idle Parameters | | |
| Idle Vehicle Speed Limit, mph (km/h) | 1 to 15 mph (2 to 24 km/h) | 1 mph (2 km/h) |
| Idle RPM Limit | 600 to 2120 rpm | 2120 rpm |
| Idle/PTO RPM Ramp Rate | 5 to 1000 rpm/second | 50 rpm/sec |
| Idle/PTO Bump RPM | 5 to 500 rpm | 20 rpm |
| Dedicated PTO Parameters | | |
| PTO Configuration | Off, Cab Switches, Remote Switches, Remote Throttle | OFF |
| PTO Top Engine Limit | 600–2120 rpm | 2120 rpm |
| PTO Engine RPM, Set Speed | Low Idle—PTO TEL | 0 rpm |
| PTO to Set Speed | YES, NO | NO |
| PTO Cab Throttle RPM Limit | TEL, Low Idle, PTO TEL | TEL |
| PTO Vehicle Speed Limit | 1 to 127 mph (2 to 204 km/h) | 1 mph (2 km/h) |
| Torque Limit, lb ft (N · m) | 200 lb ft-Rated Torque (270 N · m-Rated Torque | 2000 lb ft (2700 N · m) |
| PTO Shutdown Time (0 = Off) | 3 to 1440 minutes | 0 minutes |
| PTO Activates Cooling Fan | Normal, Continuous | Normal |
| Engine/Gear Parameters | | |
| Lower Gears Engine RPM Limit | 1100 to 2120 rpm | 2120 rpm |
| Lower Gears Turn Off Speed, mph (km/h) | 3 to 30 mph (5 to 49 km/h) | 3 mph (5 to 49 km/h) |
| Intermediate Gears Engine RPM Limit | 1100–2120 rpm | 2120 rpm |
| Intermediate Gears Turn On Speed, mph (km/h) | 5 to 50 mph (8 to 80 km/h) | 5 mph (8 km/h) |
| Gear Down Protection RPM Limit | 1300 to 2120 rpm | 2120 rpm |
| Gear Down Protection Turn On Speed, mph (km/h) | 30 to 127 mph (48 to 204 km/h) | 127 mph (204 km/h) |
| Top Engine Limit | 1600 to 2120 rpm | 1820 rpm |
| Top Engine Limit with Droop | NO, YES | NO |
| Low Idle Engine RPM | 600 to 750 rpm | 600 rpm |
| Transmission Style | Manual, Auto w/2 Brake Sw, Auto w/o 2 Brake Sw | Manual |
| Timer Parameters | | |
| Idle Shutdown Time (0 = OFF) | 3 to 1440 minutes | 0 |
| Allow Idle Shutdown Override | YES, NO, Outside Temp Based | YES |
| Minimum Idle Shutdown Outside Temperature | −40° to 120° F. (−40° C. to 49° C.) | 120° F. (49° C.) |
| Maximum Idle Shutdown Outside Temperature | −40° to 120° F. (−40° to 49° C.) | 120° F. (49° C.) |
| A/C Pressure Switch Fan On-Time (0 = OFF) | 30 to 600 seconds | 0 seconds |
| Fan with Engine Retarder in High Mode | YES, NO | YES |
| Engine Monitoring Parameters | | |
| Engine Monitoring Mode | OFF, Warning, Derate, Shutdown | Warning |
| Coolant Level Sensor Enable/Disable | YES, NO | Yes |
| Maintenance Indicator Parameters | | |
| Maintenance Indicator Mode | OFF, Man-Distance, Man-Hr, Man-Hr., Auto - Distance, Auto-Hr. | OFF |
| PM1 Interval: (for Manual Maintenance Indicator Mode) | | |
| Miles | 5000 to 35000 miles | 15000 miles |
| Kilometers | (8050 to 56350 Km) | (24150 km) |
| Hours | 100 TO 750 hours | 300 hours |
| Engine Oil Capacity, quarts (liters): (for Automatic Maintenance Indicator Mode) | 20 to 60 quarts (19 to 57 liters) | 30 qts., (28 l.) |
| 3176B, C-10, C-12 | | |
| 3406E | | 40 qts., (38 l.) |
| Trip Parameters | | |
| Fuel Correction Factor | −63.5 to 63.5 | 0 |
| Dash Display Access Parameters | | |
| Change Fuel Correction Factor | YES, NO | NO |
| PM1 Reset | YES, NO | NO |
| Fleet Trip Reset | YES, NO | NO |
| Theft Deterrent | YES, NO | NO |
| Theft Deterrent Password | Four Characters | |
| Quick Stop Rate (0 = OFF) | 3–15 mph/s (5–24 km/h/s) | 0 mph/s (0 km/h/s) |
| ECM Date/Time Clock | | |
| Clock, month, day, year, hour, minute, second, AM/PM | mmm dd yyyy, aa:bb:cc AM/PM | |
| Output Selections | | |
| Multi-Function Output #2 | None, Auxiliary Brake, Engine Running Output, Shutdown Output | Auxiliary Brake |
| Multi-Function Output #3 | None, Auxiliary Brake, Engine Running Output, Shutdown Output | None |
| Fan Control Type | On-Off, None | On-Off |
| Customer Passwords | | |
| Customer Password #1 | 8 Digits, Available Characters | |
| Customer Password #2 | Service Tool Dependent | |

-continued

CUSTOMER SPECIFIED PARAMETER TABLE

| Parameter | Available Range/Options | Defaults |
|---|---|---|
| Data Link Parameters | | |
| Powertrain Data Link | OFF, J1922, J1939, J1922 & J1939 | J1922 |
| Parameter Lockout | | |
| Customer Parameter Lockout (9 Parameters Possible) | unlocked/locked | unlocked |

We claim:

1. An apparatus for use in connection with an compression ignition engine, said apparatus comprising:

an electronic controller;

memory connected to said electronic controller, said memory having stored therein a plurality of customer programmed vehicle operating parameters;

a communication device connected to said electronic controller, said communication device permitting customer selected vehicle parameters to be programmed into said electronic controller and read from said electronic controller;

wherein said electronic controller controls said engine at least in part based on said customer selected vehicle parameters; and wherein said communication device compares said programmed vehicle parameters to a predetermined set of desired engine and vehicle operating parameters, and produces an output indicating the programmed vehicle parameters that differ from said predetermined set of desired engine and vehicle operating parameters.

2. An apparatus for use in connection with an compression ignition engine, said apparatus comprising:

an electronic controller;

memory connected to said electronic controller, said memory having stored therein a plurality of customer programmed engine operating parameters;

a communication device connected to said electronic controller, said communication device permitting customer selected parameters to be programmed into said electronic controller and read from said electronic controller;

wherein said electronic controller controls said engine at least in part based on said customer selected parameters; and wherein said communication device compares said programmed engine to a predetermined set of desired engine operating parameters, and produces an output indicating the programmed engine and vehicle parameters that differ from said predetermined set of desired engine and vehicle operating parameters.

3. A method of verifying customer programmed vehicle operating parameters, said method used in connection with an electronic controller on a compression ignition engine, said electronic controller having an input/output device which permits input of data into the electronic controller and output of data from the electronic controller, said method comprising:

downloading customer programmed vehicle operating parameters;

comparing said downloaded parameters with a predetermined set of expected vehicle operating parameters; and producing an output in response to said step of comparing.

4. A method of verifying customer programmed engine operating parameters, said method used in connection with an electronic controller on a compression ignition engine, said electronic controller having an input/output device which permits input of data into the electronic controller and output of data from the electronic controller, said method comprising:

downloading customer programmed engine operating parameters;

comparing said downloaded parameters with a predetermined set of expected engine operating parameters; and producing an output in response to said step of comparing.

5. The method according to claim one including:

downloading customer programmed vehicle operating parameters;

comparing said downloaded parameters with a predetermined set of expected vehicle operating parameters; and producing an output in response to said step of comparing.

* * * * *

UNITED STATES PATENT AND TRADEMARK OFFICE
CERTIFICATE OF CORRECTION

PATENT NO.    : 5,884,210
DATED         : March 16, 1999
INVENTOR(S)   : Mark E. Rettig et al.

It is certified that error appears in the above-identified patent and that said Letters Patent is hereby corrected as shown below:

<u>Column 8,</u>
Line 37, remove the word "one" and replace with -- four --.

Signed and Sealed this

Twenty-fourth Day of September, 2002

Attest:

Attesting Officer

JAMES E. ROGAN
*Director of the United States Patent and Trademark Office*